Oct. 25, 1966     J. F. ROSS     3,281,309
CERAMIC BONDING
Filed Dec. 12, 1961

Inventor:
John F. Ross
by Ernest W. Legree
His Attorney

United States Patent Office 3,281,309
Patented Oct. 25, 1966

3,281,309
CERAMIC BONDING
John F. Ross, Shaker Heights, Ohio, assignor to General Electric Company, a corporation of New York
Filed Dec. 12, 1961, Ser. No. 158,797
11 Claims. (Cl. 161—196)

This invention relates to an improved ceramic bond and more particularly to an improved method for bonding a ceramic to another ceramic or to a metal. It also relates to protective coatings on metals which the bonding materials may provide.

Heretofore, the sealing together of ceramic parts or of ceramic and metal parts has generally involved applying a metal film to the ceramic oxide surface. There are various known processes. The molybdenum-manganese process involves firing on the surface of the ceramic a mixture of powders comprising manganese and molybdenum. In the hydride process, a hydride of titanium or zirconium is applied to the surface of the ceramic and decomposed by heating in a nonoxidizing atmosphere to form a metal layer to which a bond is made by ductile solder. In the active alloy process, the parts are sealed together by forming a molten solder including a reactive metal such as titanium or zirconium between the parts to be bonded together. While these methods are very useful, the operating temperatures to which the seals thus obtained may be subjected are in general limited by the reactive metal used, to an upper limit in the range of 400 to 600° C. Higher limits are desirable.

The principal object of the invention is to provide improved bonding of ceramic to ceramic or of ceramic to metal resulting in a seal able to withstand much higher temperatures than heretofore possible. A simple single step sealing method is desired.

Another object of the invention is to provide protective or electrically new and improved insulating coatings on metals.

A ceramic material showing great promise for use as the envelope of electric discharge devices and lamps is a high density polycrystalline translucent alumina ceramic. This material and the basic method of preparing it are disclosed and claimed in copending application Serial No. 80,965, filed January 3, 1961, of Robert L. Coble, entitled "Transparent Alumina and Method of Preparation" and assigned to the same assignee as the present invention, now Patent 3,026,210. The material has a very high alumina content, for instance in excess of 99.5% $Al_2O_3$, is polycrystalline in structure and is gas tight, having essentially zero porosity. A more specific object of this invention is to provide a method particularly suitable for bonding together parts of this ceramic or for bonding metals to this ceramic.

A promising field of application for high density polycrystalline alumina is that of high intensity alkali metal vapor lamps such as sodium and cesium vapor lamps. This ceramic will withstand the attack of the vapors of these alkali metals even at high operating pressures and temperatures. Of course, in order to have a practical and useful lamp, a method of forming a bond to high density polycrystalline alumina which will withstand the attack of alkali metal vapors at high temperatures is necessary and it is an object of the invention to so provide.

In accordance with the invention, there is provided a bond between ceramic parts or between a ceramic part and a metal part by means of a high temperature melting mixture or sealing "glass-ceramic" comprising two principal metallic oxides capable of forming a eutectic at a temperature lower than the melting points of the ceramic or metal parts. It is more properly a mixture than a glass because it contains both glassy and crystalline phases, but for convenience will be termed a glass herein. The method of bonding includes the steps of applying a thin layer of the sealing glass in the form of a powder to the surfaces which are to be bonded together and heating the parts with the surfaces in contact to a temperature lower than the melting point of either component part but at least as high as the lowest eutectic temperature of the metal oxides present in the sealing glass.

Preferably one of the principal metallic oxides of the sealing glass is the same as constitutes the major ingredient of the ceramic part, for instance aluminum oxide in the case of alumina, or zirconium oxide, thorium oxide or beryllium oxide in the case of parts made up primarily of zirconia, thoria or beryllia respectively. The other principal metal oxide will be an alkaline earth metal oxide such as calcium oxide, barium oxide or strontium oxide. If desired, a minor proportion of yet another metal oxide may be provided in order to achieve desired properties, for instance to lower the eutectic temperature still further, or as a means for adjusting the coefficient of expansion of the sealing glass to a desired value in order to match the coefficient of expansion of the ceramic.

For sealing together parts of high density polycrystalline alumina ceramic, for sealing metal parts to this ceramic, and also for sealing or bonding together refractory metal parts, I prefer to use a sealing glass consisting of aluminum oxide and calcium oxide in eutectic or near eutectic proportions. Alternatively, I may use a sealing glass consisting of aluminum oxide and calcium oxide as the principal ingredients plus a minor proportion of magnesium oxide, the constituent oxides being in eutectic or near eutectic proportion.

The features of the invention believed to be novel are set forth in the claims appended hereto. The invention, however, will be better understood from a consideration of the following detailed description and the accompanying drawing wherein:

Figure 1:
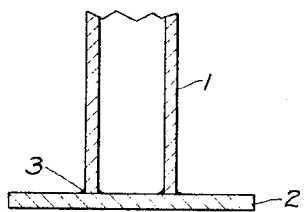
FIG. 1 illustrates an alumina tube having an alumina end cap sealed thereto by a high temperature sealing glass according to the invention.

Referring to FIG. 1 of the drawing, there is shown in side section a high density polycrystalline alumina tube 1 having an end sealed by a flat disc 2 of the same material. In an actual sample, the approximate dimensions are as follows: the tube has an internal diameter of 6 millimeters with walls 1 millimeter thick and the disc is ½ inch in diameter and 1/16 inch thick. The seal was made by painting a suspension of finely ground sealing glass according to the invention on the end of the tube or on the mating surface of the disc. Thereafter, while the parts are held together, the assembly is heated up to the melting point of the sealing glass or slightly higher but in no event above the melting point of the alumina ceramic. The sealing glass composition melts and spreads out between the mating surfaces of the ceramic and fills the joint. Upon cooling, the parts are bonded together and only a small fillet of the sealing glass indicated at 3 shows at the joining or meeting edges.

Figure 2:
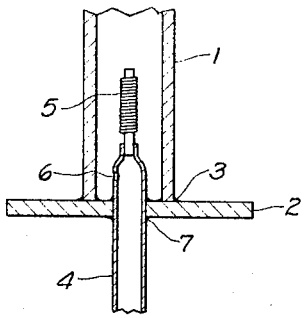
FIG. 2 illustrates a similar alumina tube having a metal tube sealed through the end cap by means of sealing glass according to the invention.

FIG. 2 illustrates a modification wherein an aperture is provided through the disc 2 through which is passed a metal exhaust tube 4 which serves also as a current inlead and as a support for an electrode 5. The aperture at 6 in the side of the exhaust tube within the envelope permits exhausting the envelope and inserting the discharge medium therein such as an inert starting gas and an alkali metal such as sodium or cesium. Thereafter the lamp is tipped off by pinching and welding shut the end of the exhaust tube. To joint the various parts together, the mating surfaces, including that of the metal tube, are painted with a suspension of the finely ground sealing glass and the assembled parts are then heated to a temperature above the melting point of the glass; upon cooling, a small fillet of sealing glass 7 remains at the joining edges of the disc and metal tube.

For sealing to alumina, the sealing glass compositions which are preferred contain alumina $Al_2O_3$ and calcium oxide CaO as the major ingredients plus added magnesium oxide MgO if desired as a minor ingredient. In experimenting by varying the proportions of the ingredients, the purpose has been to find materials which will seal alumina to alumina as well as alumina to the more refractory metals such as columbium, titanium, platinum, tantalum and molybdenum. Desirably the sealing glass compositions should melt above 1200° C. and should not be affected by sodium or cesium. The seals should be strong mechanically and remain vacuum tight upon prolonged cycling to temperatures in the range of 800 to 1000° C., that is prolonged heating to this temperature followed by cooling.

In investigating the system $CaO-MgO-Al_2O_3$, two eutectic points are encountered corresponding to minimum temperatures at which all three components are present in a single liquid phase. These are identified as points A and B and both correspond to a melting temperature of 1345° C. The proportions by weight of Examples 1 and 2 corresponding to these points are given in Table I below.

TABLE I

*Eutectic mixtures—system* $CaO-MgO-Al_2O_3$

|  | Example 1—Point A, grams | Example 2—Point B, grams |
| --- | --- | --- |
| CaO | 46.0 | 41.5 |
| MgO | 6.3 | 6.7 |
| $Al_2O_3$ | 47.7 | 51.8 |

The melting temperatures of the above eutectic mixtures at 1345° C. are much lower than the melting temperatures of the ingredients; calcium oxide has a melting temperature of 2070° C., magnesium oxide melts at 2800° C., and aluminum oxide melts at 2050° C.

Both eutectic compositions corresponding to points A and B have been used to seal alumina parts together. In sealing parts together, as the temperature is raised, the sealing glass melts sharply upon exceeding 1350° C. and spreads out in the joint between parts, joining the pieces together. Joints so made have remained in good vacuum tight condition even after approximately 1500 cyclings to 850° C. and cooling. The joints are also strongly resistant to the attack of the alkali metal vapors including even sodium vapor at the stated temperature. Thus alumina envelopes with parts bonded together by these sealing glasses are suitable for high intensity sodium vapor lamps.

EXAMPLE 3

Another sealing glass composition which is particularly suitable for sealing to alumina is a eutectic mixture of the system $CaO-Al_2O_3$. This composition, Example 3, consists of approximately equal proportions by weight of calcium oxide and aluminum oxide and has a melting temperature of approximately 1400° C.

The sealing glasses in accordance with the invention may be prepared by placing an intimate mixture of the component materials in powder form within a crucible. A sufficiently large quantity is used to line the walls of the crucible so that the powder itself forms an insulating layer which protects the walls of the crucible form the flame and prevents the glass from adhering to the walls. A portion in the center of the mass is then melted by directing an oxygen-hydrogen or oxygen-gas flame into the mass. The powder melts wherever the flame strikes forming molten globules and, by playing the flame along the globules, they may be urged together into a molten pool or pellet at the bottom of the crater which forms in the powder. The molten glass pellet or bead is then allowed to cool, lifted out of the crucible without ever having contacted its walls, and separated from the adhering powder particles. The glass bead is then crushed in a steel mortar and finally ground in a porcelain mortar with a porcelain pestle until fine enough to pass through a 100 mesh nylon screen. The sealing glass powder is then suspended in a suitable dispersing solution such as nitrocellulose in butyl acetate or a 1% polyox solution in water. In this form, it may be sprayed or brushed on to the alumina or metal surfaces desired to be sealed together.

The sealing mixture is believed to be effective by apparently dissolving some of the $Al_2O_3$ out of the alumina part. Upon cooling, there forms a bond with the alumina which may be stronger than the alumina part itself; in fact, when subjected to break-testing, the alumina frequently breaks before the seal breaks. It appears desirable to use as small a quantity of the sealing glass as will fill the opening between the parts and to use a controlled time and temperature of heating. The use of a small quantity of sealing glass is believed to minimize the effect of any mismatch in the coefficients of expansion of the glass and of the alumina, and the use of the proper time and temperature controls the attack of the liquid glass on the alumina to the desired degree.

The sealing glasses according to the invention are suitable for bonding metal parts of the more refractory metals to ceramics or to each other. By more refractory metal is meant a metal having a melting point appreciably higher than that of the sealing glass, for instance 150° C. or more higher. Some of the useful metals within this category are some stainless steels, chromium, nickel, columbium, titanium, platinum, tantalum, molybdenum and tungsten. In general the more refractory metals for the present purpose are those having melting points in excess of approximately 1400° C.

A promising field of application for such bonding is the construction of internal assemblies of evacuated devices, electric discharge or reaction devices and vacuum tubes. The sealing glasses according to the invention are most effective in sealing columbium (also known as niobium) to high density polycrystalline alumina ceramic. In FIG. 2, the metal exhaust tube 4 which serves also as current inlead is suitably of columbium and is sealed to alumina disc 2 by using any of the sealing glasses of Examples 1 to 3 herein.

The sealing glasses herein may also be used to provide thin protective coatings on the more refractory metals. They are useful to protect the metals against oxidation at high temperatures, or to provide high temperature resistant electrically insulating coatings. The coatings are formed by applying a thin layer of the sealing glass powder, preferably as a paint or suspension in a suitable vehicle, and then firing at a temperature high enough to melt the glass powder so that it runs and spreads over the metal surface. Alternatively, and particularly for small parts, the coating may be formed by dipping the part into a molten pool of the sealing glass or mixture, withdrawing the part and allowing it to cool. Another method consists in flame spraying wherein the glass powder is projected through a zone of flame and deposited directly onto the heated metal surface to be coated.

Although the eutectic mixtures in the systems CaO-MgO-Al$_2$O$_3$ and CaO-Al$_2$O$_3$ are preferred because they have the lowest melting point, variations in the proportions of the components may be used resulting in sealing glasses having higher melting points. While such sealing glasses may be harder to work with, they may be useful for applications where seals capable of withstanding higher operating temperatures are required. The following are examples of sealing glass compositions wherein departures are made from eutectic proportions. In Example 4, the composition has a melting temperature of approximately 1450° C., and in Example 5, of approximately 1590° C.

EXAMPLE 4

| | Grams |
|---|---|
| MgO | 3.1 |
| CaO | 25.8 |
| Al$_2$O$_3$ | 21.2 |

EXAMPLE 5

| | |
|---|---|
| CaO | 16.8 |
| Al$_2$O$_3$ | 33.3 |

The calcium oxide may be replaced in part by strontium oxide or barium oxide as in Examples 6 and 7 which follow.

EXAMPLE 6

| | Grams |
|---|---|
| MgO | 1.7 |
| CaO | 4.5 |
| SrO | 9.0 |
| Al$_2$O$_3$ | 13.0 |

EXAMPLE 7

| | |
|---|---|
| MgO | 1.7 |
| CaO | 4.5 |
| BaO | 13.0 |
| Al$_2$O$_3$ | 13.0 |

One may add minor proportions of glass forming ingredients such as boric acid or lithium carbonate to improve wetting or flow characteristics as in Examples 8 and 9 which follow.

EXAMPLE 8

| | Grams |
|---|---|
| CaO | 23.0 |
| MgO | 3.2 |
| Al$_2$O$_3$ | 23.9 |
| B$_2$O$_3$ | 2.0 |

EXAMPLE 9

| | |
|---|---|
| CaO | 23.0 |
| MgO | 3.2 |
| Al$_2$O$_3$ | 23.9 |
| Li$_2$O | 1.0 |

One may take the total mols of CaO in the CaO-MgO-Al$_2$O$_3$ system and split them to make the same total mols using one-third CaO, one-third SrO and one-third BaO as in Example 10 which follows:

EXAMPLE 10

| | Grams |
|---|---|
| CaO | 7.85 |
| SrO | 14.8 |
| BaO | 21.5 |
| MgO | 3.2 |
| Al$_2$O$_3$ | 23.9 |

The examples of the invention which have been specifically described herein are intended as illustrative. All have been successfully used to make seals to high density polycrystalline alumina. However various modifications will readily occur to those skilled in the art and it is intended by the appended claims to cover any such as fall within the true spirit and scope of the invention.

What I claim as new and desire to secure by Letters Patent of the United States is:

1. The method of bonding a high density polycrystalline alumina ceramic member to another member from the group consisting of a high density polycrystalline alumina ceramic and a refractory metal which comprises the steps of applying to the surfaces to be bonded together a sealing glass powder comprising principally aluminum oxide and an alkaline earth metal oxide in proportions having a melting temperature lower than the melting point of either of said members, holding the members together, and heating the members to a temperature sufficient to liquify said sealing glass powder but lower than the melting point of either of said members.

2. The method of bonding a high density alumina ceramic member to another member from the group consisting of a high density alumina ceramic and a refractory metal which comprises the steps of applying to the surfaces to be bonded together a sealing glass powder comprising principally calcium oxide and aluminum oxide in proportions having a melting temperature lower than the melting point of either of said members, holding the members together, and heating the members to a temperature sufficient to liquify said sealing glass but lower than the melting point of either of said members.

3. The method of bonding a high density polycrystalline alumina ceramic member to another member from the group consisting of a high density polycrystalline alumina ceramic and a refractory metal which comprises the steps of applying to the surfaces to be bonded together a sealing glass powder comprising principally aluminum oxide and calcium oxide in near eutectic proportions so that said sealing glass has a melting temperature lower than the melting point of said ceramic and the part to be bonded thereto, holding the parts together and heating to the liquifying temperature of said sealing glass.

4. The method defined in claim 3 wherein said sealing glass consists approximately of 47.7 parts Al$_2$O$_3$, 46.0 parts CaO and 6.3 parts MgO by weight.

5. The method defined in claim 3 wherein said sealing glass consists approximately of 51.8 parts Al$_2$O$_3$, 41.5 parts CaO and 6.7 parts MgO by weight.

6. The method defined in claim 3 wherein said sealing glass consists of approximately equal parts by weight Al$_2$O$_3$ and CaO.

7. The method of bonding a columbium member to a high density polycrystalline alumina ceramic member which comprises the steps of applying to the surfaces of said members to be bonded together a sealing glass powder comprising principally aluminum oxide and calcium oxide in near eutectic proportions so that said sealing glass has a melting temperature lower than the melting points of said ceramic and the columbium member, holding the members together and heating to the liquifying temperature of said sealing glass.

8. A member from the group consisting of a high density alumina ceramic and a refractory metal having a melting point higher than approximately 1400° C. bonded to a high density alumina ceramic member by a thin layer of glass disposed between the mating surfaces of the members and fused to both surfaces, said glass comprising principally aluminum oxide and alkaline earth metal oxides in near eutectic proportions.

9. A member from the group consisting of a high density alumina ceramic and a refractory metal having a melting point higher than approximately 1400° C. bonded to a high density alumina ceramic member by a thin layer of glass disposed between the mating surfaces of the members and fused to both surfaces, said glass consisting of approximately 47.7 parts Al$_2$O$_3$, 46.0 parts CaO, and 6.3 parts MgO by weight.

10. A member from the group consisting of a high density alumina ceramic and a refractory metal having a melting point higher than approximately 1400° C. bonded to a high density alumina ceramic member by a thin layer of glass disposed between the mating surfaces of the members and fused to both surfaces, said glass consisting of approximately 51.8 parts $Al_2O_3$, 41.5 parts CaO, and 6.7 parts MgO by weight.

11. A member from the group consisting of a high density alumina ceramic and a refractory metal having a melting point higher than approximately 1400° C. bonded to a high density alumina ceramic member by a thin layer of glass disposed between the mating surfaces of the members and fused to both surfaces, said glass consisting of approximately equal parts by weight $Al_2O_3$ and CaO.

References Cited by the Examiner

UNITED STATES PATENTS

| | | | |
|---|---|---|---|
| 2,693,668 | 11/1954 | Slayter | 154—2.2 |
| 2,771,969 | 11/1956 | Brownlow | 156—89 |
| 2,931,142 | 4/1960 | Veres | 154—2.2 |
| 2,964,881 | 12/1960 | Janssen | 65—43 |
| 2,988,853 | 6/1961 | Certa | 65—43 |
| 3,007,804 | 11/1961 | Kreidl et al. | 106—47 |
| 3,121,643 | 2/1964 | Eisenberg | 117—129 |

ALEXANDER WYMAN, *Primary Examiner.*

EARL M. BERGERT, *Examiner.*

W. J. VAN BALEN, *Assistant Examiner.*